(12) United States Patent
Danielson

(10) Patent No.: US 11,479,339 B2
(45) Date of Patent: Oct. 25, 2022

(54) PROPELLER BLADE PITCH ANGLE FEEDBACK FROM ACTUATOR ROTATION

(71) Applicant: Hamilton Sundstrand Corporation, Charlotte, NC (US)

(72) Inventor: David R. Danielson, Suffield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 353 days.

(21) Appl. No.: 16/732,726

(22) Filed: Jan. 2, 2020

(65) Prior Publication Data

US 2021/0206474 A1 Jul. 8, 2021

(51) Int. Cl.
*B64C 11/42* (2006.01)
*B64C 11/30* (2006.01)

(52) U.S. Cl.
CPC ............ *B64C 11/42* (2013.01); *B64C 11/301* (2013.01)

(58) Field of Classification Search
CPC ....... B64C 11/301; B64C 11/38; B64C 11/40; B64C 11/42
See application file for complete search history.

(56) References Cited

U.S. PATENT DOCUMENTS

| | | |
|---|---|---|
| 5,897,293 A | 4/1999 | Arel et al. |
| 6,077,040 A | 6/2000 | Pruden et al. |
| 8,439,640 B2 * | 5/2013 | Arel ......................... B64C 11/40 416/157 R |
| 10,472,050 B2 | 11/2019 | Futa, Jr. et al. |
| 2018/0306053 A1 | 10/2018 | Chapman |
| 2020/0189721 A1* | 6/2020 | Maver ..................... B64C 11/40 |

FOREIGN PATENT DOCUMENTS

EP 2261115 A2 12/2010

OTHER PUBLICATIONS

The extended European Search Report for Application No. 20217986. 7-1010; Report dated May 17, 2021; Report Received: Jun. 4, 2021; 11 pages.

* cited by examiner

*Primary Examiner* — Richard A Edgar
(74) *Attorney, Agent, or Firm* — Cantor Colburn LLP

(57) ABSTRACT

A propeller control system for controlling a blade pitch angle including: a propeller blade extending from a blade base, the propeller blade being configured to rotate around a longitudinal axis to generate thrust for the propeller blade and rotate around a pitch change axis to adjust the blade pitch angle, wherein the pitch change axis extends through a center point of the blade base; a trunnion pin operably connected to the blade base at a location offset from the center point; a yoke plate operably connected to the trunnion pin; an actuator configured to move the yoke plate linearly along the longitudinal axis to rotate the trunnion pin and the propeller blade around the pitch change axis; and a transfer tube operably connected to the yoke plate, the transfer tube being free to rotate around the longitudinal axis as the actuator moves the yoke plate linearly along the longitudinal axis.

17 Claims, 3 Drawing Sheets

PROPELLER BLADE PITCH ANGLE FEEDBACK FROM ACTUATOR ROTATION

BACKGROUND

The subject matter disclosed herein generally relates to propellers blade systems, and more specifically to a system for monitoring operation of propeller blade systems.

Propeller blades, such as propeller blades used on aircraft, may be oriented at various angles to adjust the thrust of the propeller blade.

BRIEF SUMMARY

According to one embodiment, a propeller control system for controlling a blade pitch angle is provided. The propeller control system including: a propeller blade extending from a blade base, the propeller blade being configured to rotate around a longitudinal axis to generate thrust for the propeller blade and rotate around a pitch change axis to adjust the blade pitch angle of the propeller blade, wherein the pitch change axis extends through a center point of the blade base; a trunnion pin operably connected to the blade base at a location offset from the center point of the blade base; a yoke plate operably connected to the trunnion pin; an actuator configured to move the yoke plate linearly along the longitudinal axis of the propeller blade to rotate the trunnion pin and the propeller blade around the pitch change axis; and a transfer tube operably connected to the yoke plate, the transfer tube being free to rotate around the longitudinal axis as the actuator moves the yoke plate linearly along the longitudinal axis.

In addition to one or more of the features described above, or as an alternative, further embodiments may include: a blade angle sensing system configured to determine the blade pitch angle in response to a rotational direction and a rotational magnitude of the transfer tube relative to the propeller hub.

In addition to one or more of the features described above, or as an alternative, further embodiments may include that the blade angle sensing system further includes: a differential rotation sensor configured to detect the rotational direction and the rotational magnitude of the transfer tube relative to the propeller hub.

In addition to one or more of the features described above, or as an alternative, further embodiments may include: a differential gear train mechanically connected to the transfer tube.

In addition to one or more of the features described above, or as an alternative, further embodiments may include: a propeller hub, wherein the differential gear train is mechanically connected to the propeller hub.

In addition to one or more of the features described above, or as an alternative, further embodiments may include that the differential gear train further includes: a first input, the propeller hub mechanically connects to the differential gear train at the first input and is configured to rotate the first input at a first rotational velocity; a second input, the transfer tube mechanically connects to the differential gear train at the second input and is configured to rotate the second input at a second rotational velocity; a differential gear train output shaft rotates in a first direction or a second direction with a rotational velocity proportional to the difference between the first rotational velocity and the second rotational velocity.

In addition to one or more of the features described above, or as an alternative, further embodiments may include that the blade angle sensing system further includes: a differential rotation sensor configured to detect the rotational velocity of the differential gear train output shaft.

In addition to one or more of the features described above, or as an alternative, further embodiments may include the actuator is a hydraulic actuator, and wherein the transfer tube is configured to deliver hydraulic fluid through the transfer tube to the actuator.

According to another embodiment, a method for controlling a blade pitch angle of a propeller blade is provided. The method including: activating an actuator operably connected to a yoke plate; translating, using the actuator, the yoke plate along a longitudinal axis when the actuator is activated, the yoke plate being operably connected to a trunnion pin; rotating, using the yoke plate, the trunnion pin around a pitch change axis of the propeller blade when the yoke plate is translated, the trunnion pin being operably connected to a blade base of the propeller blade at a location offset from a center point of the blade base; rotating, using the trunnion pin, the blade base around the pitch change axis when the trunnion pin is rotated, wherein the pitch change axis extending through the center point of the blade base and the propeller blade extending from the blade base; rotating, using the blade base, the propeller blade around the pitch change axis to adjust the blade pitch angle of the propeller blade when the blade base is rotated; and rotating, using the yoke plate, a transfer tube around a longitudinal axis of the propeller blade when the yoke plate is translated, the propeller blade being configured to rotate around the longitudinal axis to generate thrust for the propeller blade.

In addition to one or more of the features described above, or as an alternative, further embodiments may include: determining, using a blade angle sensing system, the blade pitch angle in response to a rotational direction and a rotational magnitude of the transfer tube relative to the propeller hub.

In addition to one or more of the features described above, or as an alternative, further embodiments may include: detecting, using a differential rotation sensor, the rotational direction and the rotational magnitude of the transfer tube relative to the propeller hub.

In addition to one or more of the features described above, or as an alternative, further embodiments may include: rotating a differential gear train using the transfer tube, the differential gear train being mechanically connecting the transfer tube.

In addition to one or more of the features described above, or as an alternative, further embodiments may include: rotating the differential gear train using a propeller hub, wherein the differential gear train is mechanically connected to the propeller hub.

In addition to one or more of the features described above, or as an alternative, further embodiments may include: rotating a first input of the differential gear train at a first rotational velocity, the propeller hub mechanically connects to the differential gear train at the first input; and rotating a second input of the differential gear train at a second rotational velocity, the transfer tube mechanically connects to the differential gear train at the second input, wherein a differential gear train output shaft of the differential gear train rotates in a first direction or a second direction with a rotational velocity proportional to the difference between the first rotational velocity and the second rotational velocity.

In addition to one or more of the features described above, or as an alternative, further embodiments may include: detecting, using a differential rotation sensor, the rotational velocity of the differential gear train output shaft.

In addition to one or more of the features described above, or as an alternative, further embodiments may include: rotating the differential gear train output shaft in a first direction when the first rotational velocity is greater than the second rotational velocity.

In addition to one or more of the features described above, or as an alternative, further embodiments may include: rotating the differential gear train output shaft in a second direction when the first rotational velocity is less than the second rotational velocity, the second direction being opposite the first direction.

In addition to one or more of the features described above, or as an alternative, further embodiments may include: maintaining the differential gear train output shaft rotationally stationary when the first rotational velocity is equal to the second rotational velocity.

In addition to one or more of the features described above, or as an alternative, further embodiments may include: delivering, using the transfer tube, hydraulic fluid through the transfer tube to the actuator, wherein the actuator is a hydraulic actuator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Some propeller pitch change actuator concepts result in an actuator yoke that rotates relative to the actuator housing that is anti-rotated against the propeller hub and eventually the propeller shaft. This causes a relative rotation between the actuator yoke and the propeller shaft as the propeller blade pitch angle is changed. Embodiments disclosed herein implement a differential gear set in the propeller control module mounted behind the propeller shaft on the propeller gearbox and provide that propeller control module with a mechanical connection to both the propeller shaft and the actuator yoke (via an oil transfer tube for example). A rotary variable differential transformer (RVDT), a potentiometer, Resolver, or other similar device could be used to calculate propeller blade pitch angle.

Figure 1:
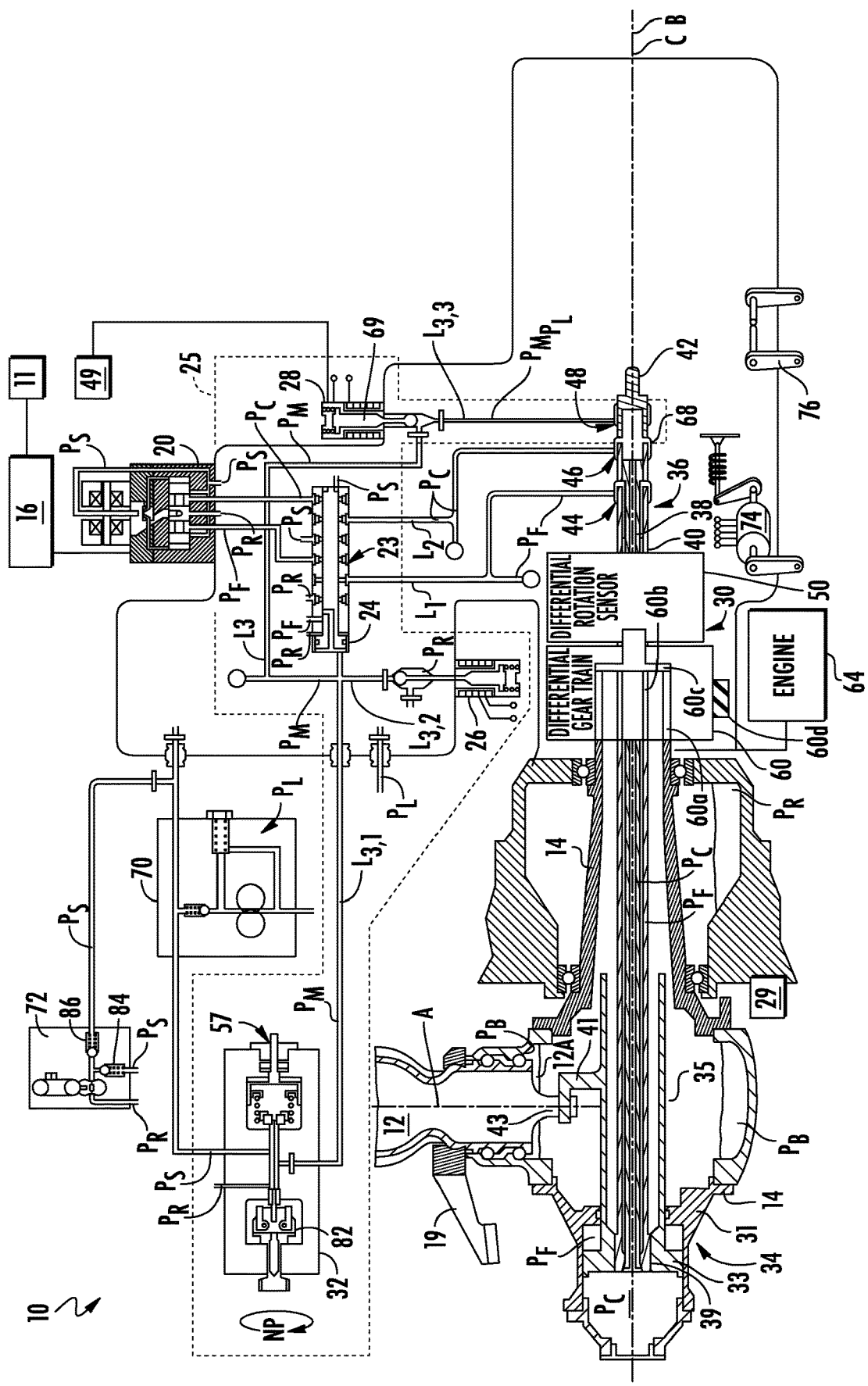
FIG. 1 is a partial cross-sectional illustration of propeller control system, according to an embodiment of the present disclosure.

FIG. 1 schematically illustrates a propeller control system 10, according to an embodiment of the present disclosure. The propeller control system 10 may be an electronic/hydraulic propeller control system. The propeller control system 10 is used to monitor and change blade pitch angles of blades 12 to a desired in-flight blade pitch angle. System 10 generally includes an electronic control 16 and a hydromechanical portion 18. The hydromechanical portion 18 generally includes control valve 20, used by the electronic control 16, a protection valve 24 also used in part by the electronic control 16, a mechanical backup system 25, as indicated by the dotted lines, including the protection valve 24, a feather solenoid 26, a secondary low pitch stop system 28, and an overspeed governor 32. It is understood that the embodiments disclosed herein are not limited by the hydromechanical portion 18 illustrated and described herein and that the embodiments described herein may be incorporated in different hydromechanical portions. Additional elements may be included in both the electronic and hydromechanical system portions in addition to the elements that are discussed in detail herein.

Hydraulic pressure, for actuating the various mechanism disclosed herein, is indicated generally in FIG. 1 by the darkened lines and is designated more specifically in FIG. 1 and throughout the text by the $P_{subscript}$ designations, wherein $P_S$ is a supply pressure, $P_C$ is a coarse pitch change pressure, $P_F$ is a fine pitch change pressure, $P_L$ is a lube pressure, $P_R$ is a return pressure, $P_B$ is a barrel lube pressure, and $P_M$ is a mechanical backup system pressure.

The electronic control 16 preferably includes interfaces to integrate the same with other aircraft systems. Accordingly, a communication link between the electronic control 16 and the other aircraft systems in a known manner is provided via an electronic engine control system so that the electronic control 16 can gather flight data for controlling the propeller and communicate with these other aircraft systems. Accordingly, as information is gathered via this link, blade pitch angles can be adjusted to comply with specific flight conditions, in accordance with the system as described herein.

Electronic control systems, such as the electronic control 16, have been implemented as control systems for achieving more accurate control over blade pitch angle monitoring, control and change. Accordingly, the electronic control 16 functions with the control valve 20, through the protection valve 24 for controlling the metering of hydraulic fluid $P_F$ and $P_C$ to and from the actuator 34 for both fine, i.e. low pitch, and coarse, i.e. high pitch, control and adjustment of the pitch angle of the propeller blades 12. Preferably, the electronic control 16 is a dual channel microprocessor based unit, having a primary channel and a backup channel, which provides closed loop control of the pitch of the propeller blades 12. The electronic control 16 functions to control speed governing, synchrophasing, beta control, feathering and unfeathering. In addition to these functions, the unit will detect, isolate and accommodate control system faults. An example of a controller which may be used in the electronic control 16 for achieving the aforementioned functions, is EPC 100-1, manufactured by Hamilton Sundstrand Corporation, a division of United Technologies Corporation, the assignee of the present application. The electronic control 16 is preferably programmed in a known manner to perform the functions as set forth above. The electronic control 16 is connected in and in communication with the control valve 20. Accordingly, the electronic control 16 is operational to send electronic signals to the control valve 20 for initiating and maintaining hydraulic fluid metering for operating the actuator 34, described in detail below.

The electronic control 16 also controls propeller RPM wherein a governing RPM is selected from one of preferably four values stored in software provided in the electronic control. The electronic control 16 will compare sensed propeller RPM to the selected governing RPM and to correct any diversion from the governing RPM, the electronic control 16 will calculate and invoke a pitch change in blades 12 by way of a control valve 20. Accordingly, when multiple propellers of a multiple propeller aircraft have stabilized at a selected governing RPM, synchrophaser control is initiated. An electronic control 16 may be provided for each of the propellers in the multi propeller system and in accordance with known means, a master and slave arrangement is provided for controlling RPM differentials between the propellers. That is, small changes will be made to the reference speed of the slave propeller, whichever is selected, to achieve a constant phase relationship with the master propeller.

The electronic control 16 is designed to automatically compensate for any single or any combination of faults that may be experienced thereby. Accordingly, a pilot will be advised of a fault that occurs in the electronic control 16 via signals controlled by the electronic control. Any combination of faults that would disable both channels of the electronic control 16 are accommodated by the mechanical backup system 25, and specifically the overspeed governor 32 and the secondary low pitch stop system 28. Accordingly, the safe completion of flight is allowed regardless of the faults. Fault accommodation by the electronic control 16 includes the automatic transfer of control to the backup channel thereof if certain faults are detected by the primary channel here of or in of any of the electromechanical device control interfaces with. The accommodations further includes the automatic reinitialization of a primary channel when confrontational faults are detected, and restoration of control by the primary channel when health is restored. And finally, accommodation includes the automatic reversion to alternate control modes when signals required for operation in normal control modes are not available to either channel.

The control valve 20 is preferably in the form of an electrohydraulic, four-way jet pipe, servo valve, as known in the art, that controls blade pitch rate by metering hydraulic flow to actuator 34. The flow of hydraulic pressure $P_F$, $P_C$ supplied via the control valve 20 is proportional to a milliamp electrical signal received from the electronic control 16 over at least one of its two independent electrical channels, after the electronic control 16 has communicated with the other aircraft systems to determine the appropriate blade pitch angle of the propeller blade 12. The control valve 20 has two independent electrical channels for communication with the two electrical channels of the electronic control 16. The design of control valve 20 is known in the art.

An example of feedback that the electronic control 16 receives from other aircraft systems is the propeller speed feedback provided by sensors 29, positioned near blades 12 for providing blade speed data. The sensors 29 are preferably in the form of magnetic speed pickups although other sensing devices may be utilized. The pickups are adapted to be placed behind the propeller blades 12 for sensing and providing propeller speed to each channel of the electronic control 16. Also, a single coil pickup provides a remote propeller speed signal to the primary channel of the electronic control 16, to facilitate synchrophasing.

As indicated, the protection valve 24 is associated with the hydromechanical portion 18. In an embodiment, it is operable to direct hydraulic fluid hydraulic pressure $P_F$, $P_C$ from the control valve 20 to the transfer tube 36 for use with the actuator 34 for adjusting blade pitch angle. The protection valve 24 is preferably in the form of a spool valve, as known in the art, although other types of valves may be utilized, having a plurality of channels 23 through which hydraulic pressure is ported. Hydraulic fluid flows from the control valve 20 of the electronic control 16 through the protection valve 24. The protection valve 24 allows the mechanical backup system 25 to back up the electronic control 16 by allowing the same to assume pitch change control authority from the electronic control 16, and the control valve 20, after the occurrence of an electronic malfunction, or other condition such as a testing routine or manual override. As indicated in the figure, coarse pitch hydraulic pressure $P_C$ originates from the control valve 20 in line $L_2$ and continues in line $L_2$ to the transfer tube 36 for use in controlling the pitch angle of the blades 12 toward high pitch. Also, fine pitch hydraulic pressure $P_F$ flows through line $L_1$ through the protection valve 24 to the transfer tube 36, as shown in the FIG. 1, for controlling the pitch angle of the propeller blades 12 toward low pitch. Accordingly, in the electronic mode, the protection valve 24 is aligned with the control valve 20 for allowing hydraulic fluid flow through lines $L_1$ and $L_2$ for fine and coarse blade pitch angle adjustment, respectively, as commanded by the electronic control 16.

In the event that the electronic control 16 fails, is manually overridden, or a testing routine is implemented, the protection valve 24 is operative to reposition to a protection position and cut off flow pressure $P_F$, $P_C$ as supplied from the control valve 20 and through lines $L_1$ and $L_2$. That is, hydraulic pressure $P_M$ is drained from the protection valve 24 through a combination of lines $L_3$, $L_{3,1}$, $L_{3,2}$, $L_{3,3}$, of the mechanical backup system 25 for invoking a valve shift. In general, as the protection valve 24 is actuated for placing one of the backups in command, supply hydraulic pressure $P_S$ is connected with line $L_2$ for providing pressure $P_C$ to the coarse (high) side of an actuator piston 33 (described below) and the fine (low) pitch side of the actuator piston 33 is ported to drain. Actuation of the propeller blades 12 to a coarser pitch is thereby achieved.

Supplemental to the mechanical backup system 25, the propeller blades 12 may include counterweights 19 to prevent an overspeed or the minimum in-flight blade pitch angle from being violated due to main and/or auxiliary pump failure, as opposed to the electronic control 16 malfunction. That is, the counterweights 19 may be provided on each of the propeller blades 12 to provide centrifugal twisting moments about the blade axis toward increased pitch. Accordingly, if the main hydraulic and/or the auxiliary pumps fail, the propeller blades 12 are still prevented, decreasing pitch sufficiently to cause a propeller overspeed or from violating the minimum in-flight angle.

Figure 2:
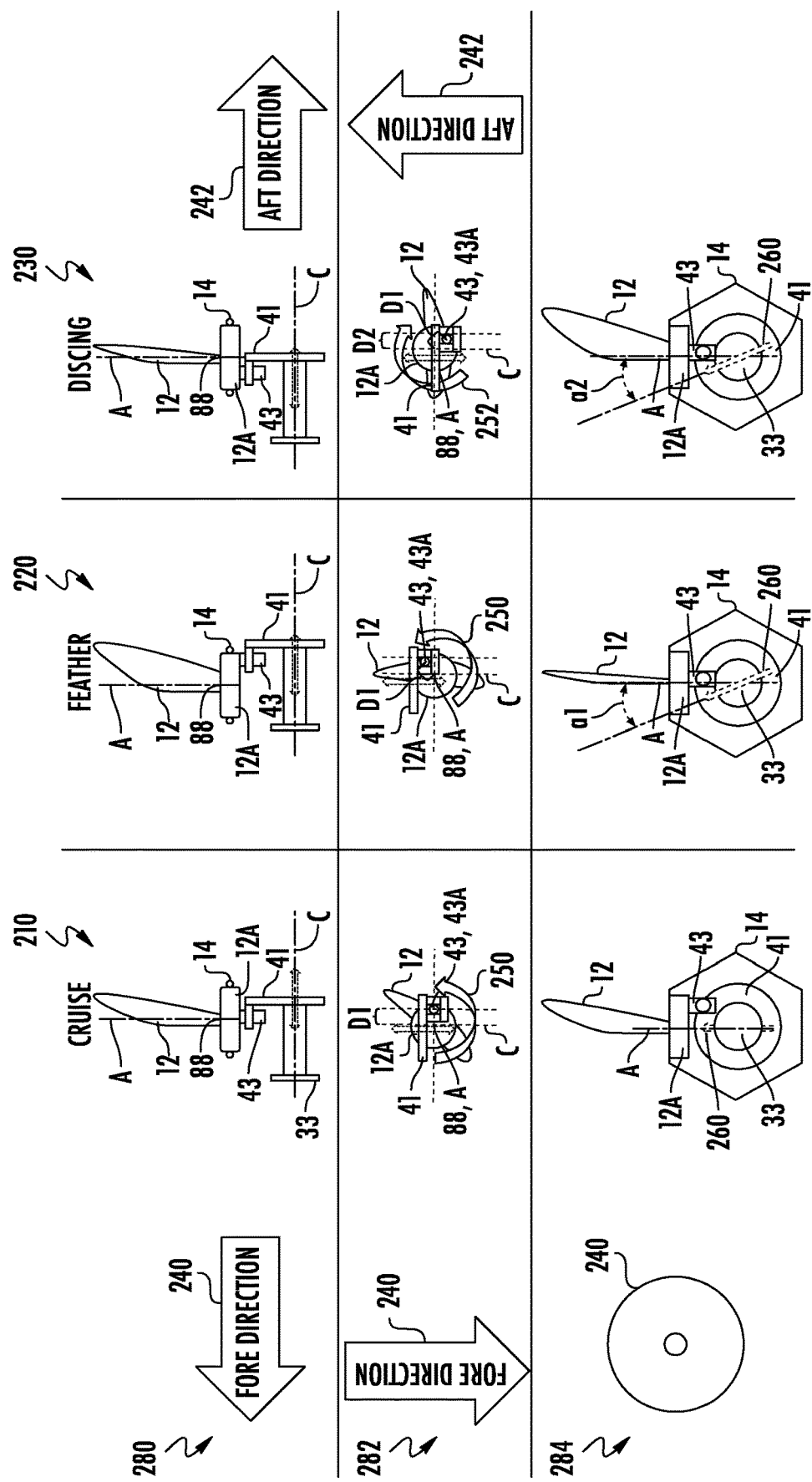
FIG. 2 is a schematic illustration of different blade pitch angles for a propeller blade of the propeller control system of FIG. 1, according to an embodiment of the present disclosure.

Both the electronic control 16, in combination with the control valve 20, and mechanical backup system 25, through the protection valve 24, are capable of controlling the actuator 34 via hydraulic fluid flow through the transfer tube 36. In an embodiment, the actuator 34 is a hydraulic actuator. The actuator 34 is preferably a linear dual acting hydraulic actuator, although other designs may be utilized, which provides the force required to react to flight loads acting on the blades and to affect changes in blade pitch angle. The primary components of the actuator 34 are a dome 31, the actuator piston 33, a yoke shaft 35, and a yoke plate 41. The dome 31 is the pressure vessel that contains the coarse hydraulic pressure, $P_C$, and fine hydraulic pressure $P_F$. The differential between coarse and fine pressures acts across the actuator piston 33 to generate the force required to change the blade pitch of the propeller blades 12. The actuator piston 33 is attached to the yoke shaft 35 and translates fore and aft with the yoke shaft 35 as hydraulic pressure is metered to the coarse and fine pitch sides of the actuator piston 33 by the propeller control system 10. The yoke plate 41 are attached to the yoke shaft 35. In alternate embodiments, there may be more than one yoke plate 41. The yoke plate 41 allows the actuator 34 to engage a trunnion pins 43 of the propeller blades 12. Each propeller blade 12 has a trunnion pin 43 connecting the propeller blade 12 to the yoke plate 41. The trunnion pin 43 operable connects to the propeller blade 12 at a blade base 12A. The trunnion pin 43 may be integral to the blade base 12A, machined as part of the blade base 12A, or the trunnion pin can be pressed into the blade base 12A during a manufacture process. The trunnion pin 43 is offset (i.e., not centered on a center point 88, see FIG. 2) on the blade base 12A, as illustrated in FIG. 2. Since the trunnion pin 43 is offset from the pitch change axis A of the propeller blades 12, the linear motion of the actuator 34 is converted to rotation of the propeller blades 12 about their pitch change axis A. The pitch change axis A extend through a the center point 88 of the blade base 12A. The trunnion pin 43 is operably connected to the blade base 12A offset from the pitch change axis A, as illustrated in FIG. 2. The propeller blade 12 is configured to rotate around the pitch change axis A to adjust a pitch (i.e., angle of attack) of the propeller blade 12.

The actuator 34 does not contain an anti-rotation arm which would act to prevent the actuator piston 33, transfer tube 36, and the yoke plate 41 from rotating relative to the propeller hub 14, thus the actuator piston 33, transfer tube 36, and the yoke plate 41 are free to rotate and are configured to rotate with the trunnion pin 42. An anti-rotation arm may be seen in U.S. Pat. No. 5,897,293, which is hereby incorporated by reference. Without an anti-rotation arm, the transfer tube 36 is free to rotate relative to the propeller hub 14 around the longitudinal axis C as the actuator 34 moves the yoke plate 41 along the longitudinal axis C.

The transfer tube 36 is configured to deliver hydraulic fluid through the transfer tube 36 to the actuator 34. The transfer tube 36 is preferably comprised of an inner tube 38 and an outer tube 40. The inner tube 38 preferably receives hydraulic pressure $P_C$ for controlling coarse blade pitch angle changes of the propeller blades 12. The transfer tube 36 includes a longitudinal axis B extending through the center of the transfer tube 36 from a first end 42 of the transfer tube 36 to a second end 39 of the transfer tube 36. The outer tube 40 is concentric to the inner tube 38. The outer tube 40 and the inner tube 38 are each centered on the longitudinal axis B. The outer tube 40 is adapted to receive hydraulic pressure $P_F$ from the hydromechanical portion 18 for controlling fine blade pitch angle changes. At the first end 42 of the transfer tube 36, a transfer bearing 68 is provided for transmitting $P_C$ and $P_F$ through windows 44, 46, 48 from lines $L_1$, $L_2$, and $L_{3,3}$, respectively. An orifice 48 is used to drain fluid under pressure $P_M$ from line $L_{3,3}$ for causing a shift in the protection valve 24 to the protection position, as a part of the low pitch stop system 28. The transfer tube 36 is rotatable with the propeller assembly and is also translatable fore and aft with the yoke shaft 35 during blade pitch angle adjustment. The rotational motion of transfer tube 36 relative to the propeller hub 14 is used by blade angle sensing system 30. The blade angle sensing system 30 is configured to determine a blade pitch angle for use by the electronic control 16 in response to a rotational direction and rotational magnitude of the transfer tube 36 relative to the propeller hub 14.

The blade angle sensing system 30 is in electrical communication with the electronic control 16 for providing constant updates on the blade pitch angles of the various the propeller blades 12. The electronic control 16 uses this data from system 30 to determine when to activate the control valve 20, for coarsely adjusting blade pitch angle toward higher pitch or finely adjusting blade pitch angle toward lower pitch via the metering of hydraulic fluid through the transfer tube 36 to the actuator 34. The blade angle sensing system 30 includes a differential rotation sensor 50 configured to detect the rotational direction and the rotational magnitude of the transfer tube 36 relative to the propeller hub 14. The differential rotation sensor 50 may include an RVDT, a potentiometer, a resolver, or any similar device known to one of skill in the art. The differential rotation sensor 50 uses the sensed relative rotational movement of the transfer tube 36 to the propeller hub 14 for determining blade pitch angle, which is then forwarded as an electrical signal of actuator position to the electronic control 16.

The overspeed governor 32 is also used as a backup device in mechanical backup system 25 and is in fluid communication with the protection valve 24. The overspeed governor is preferably a fly weight actuated, metering valve, which, when invoked, modulates flow of hydraulic fluid at pressure $P_M$ from the reference pressure side of the protection valve 24. The flow rate is proportionate to the differential between the reference speed of the governor and the propeller speed, as sensed by the flyweights 82 of the overspeed governor 32, which flyweights are used to determine and initiate actuation of the governor. The overspeed governor 32 may incorporate a solenoid valve 57 to be energized by electrical power from the aircraft interface to increase the governor reference speed for landing transients. The specific design of the governor is known in the art and accordingly is not further described here. However, the overspeed governor 32 is connected to the protection valve 24 such that in the event of a malfunction in the electronic control 16 which causes the propeller blades 12 to reach an overspeed condition, such as too fine a pitch angle, the overspeed governor 32 assumes control upon sensing overspeed by flyweights 82, for limiting such overspeed by adjusting pitch angle in the coarse direction. That is, if a malfunction in the electronic control 16 results in an inadvertent command of blade pitch angle such that overspeed is reached, the mechanical backup system 25, and specifically the overspeed governor 32, acts to override the electronic control 16 and coarsely adjust blade pitch angle by assuming pressure control through line $L_{3,1}$ as the protection valve 24 blocks flow from the control valve 20. Accordingly, governor 32 meters hydraulic pressure $P_M$ to drain, causing the protection valve 24 to shift and port supply pressure $P_S$ to the coarse pitch side of the actuator piston 33 as fluid pressure $P_C$, through line $L_2$, as fine pitch fluid pressure $P_F$ is drained. Pressure $P_M$ from the protection valve 24 is metered by overspeed governor 32 through line $L_{3,1}$ for coarse pitch adjustment until the overspeed condition is averted. Blade pitch angle is thereby adjusted through the actuator 34 by way of the transfer tube 36.

A test of the overspeed governor 32 may be performed on ground prior to flight. A pilot activatable switch 11, shown schematically, is preferably provided in the cockpit for sending a discrete signal directly to the electronic control 16, causing the electronic control 16 to adjust blade pitch angle and send the propeller into overspeed Accordingly, the overspeed governor 32 will be monitored to determine if it properly assumes RPM control from the electronic control 16. The pilot activatable switch 11 will be operational only on ground and will be automatically deactivated via the electronic control 16 during flight conditions.

The secondary low pitch stop system 28 includes metering the orifice 48 and a retraction solenoid 69, which assume flow control from the control valve 20 when the retraction solenoid 69 is in the normally open position and the minimum in-flight angle is breached. Similar to overspeed and the overspeed governor 32, when the electronic control 16 fails to enforce the minimum in-flight blade pitch angle, control to enforce the minimum blade pitch angle is switched to low pitch stop the secondary low pitch stop system 28. In this manner, the transfer tube 36 translates to a position indicative of minimum in-flight angle violation, and thereby uncovers the secondary low pitch stop orifice 48 in the transfer bearing 68, for initializing actuation of the secondary low pitch stop system 28. Hydraulic pressure $P_M$ is drained through the orifice 48, causing a pressure differential in the protection valve 24 and a subsequent shift to the protected position. The spool of protection valve 24 is shuttled left toward the protection position, where flow is blocked from the control valve 20. Line L, is drained and supply pressure $P_S$ is metered to line $L_2$ as pressure $P_C$ to the actuator 34. Blade pitch angle is thereby coarsely adjusted using actuator 34 away from the minimum in-flight angle until the blades reach a steady state position.

The secondary low pitch stop system 28 may be tested with the propeller blades 12 being unfeathered on the ground by the electronic control 16. That is, to run a test, the electronic control 16 will automatically depower the solenoid 69 of the secondary low pitch stop system 28 to the open position, enabling the stop, and command blade pitch angle below the minimum in flight setting. At this time, The secondary low pitch stop system 28 will override the command from the electronic control 16, enforcing the minimum in-flight blade pitch angle. The electronic control 16 will then employ sensing the blade angle sensing system 30 to determine if the blade pitch angle being maintained by the secondary low pitch stop system 28 is the desired minimum in-flight blade pitch angle, thereby checking the accuracy of the secondary low pitch stop system 28.

Since the solenoid 69 is in the open position during actuation of the low pitch stop system, the electronic control 16 may reverse the propeller blades 12 by having the solenoid 69 powered closed, thereby closing line $L_{3,3}$ from line $L_3$ and the protection valve 24, and deactivating the secondary low pitch stop system 28. The propeller blades 12 may then be moved through the minimum in-flight blade pitch angle to reverse and ground range operation positions, without the electronic control 16 and the control valve 20 being cut-off and backed up. Preferably, a cabin positioned switch 49, shown schematically, is provided for deactivating the solenoid 69. The cabin positioned switch 49 is automatically deactivated for in-flight conditions.

The feather solenoid 26 is the last backup device of system 10. The feather solenoid is energizable by an electric signal from a discrete source, preferably a manual override switch, for draining hydraulic pressure $P_M$ from the metered pressure side of the protection valve 24, to rapidly command blade pitch angle to the feather position. Typically, feathering is accomplished through the electronic control 16 via a discrete input. However, if the electronic control 16 malfunctions, a pilot can override it and feather can be independently accomplished through the feather solenoid 26. In this manner, metered pressure $P_M$ from line $L_{3,2}$ is rapidly drained from the protection valve 24 as hydraulic pressure $P_C$ causing the protection valve 24 to shuttle to the fully protected position. Full supply pressure $P_S$ is then applied from the protection valve 24 as pressure $P_C$ through line $L_2$ to the coarse pitch side of the actuator piston 33, and the fine pitch side is ported to drain through line $L_1$, resulting in a blade pitch angle slew rate toward feather.

Additional elements of the system include a main pump 70, preferably in the form of a positive displacement gear type pump readily available in the art, which functions to provide hydraulic power required for normal pitch change operation to the actuator 34, as is known in the art. An auxiliary pump 72 is also provided for backing up the main pump 70 in case of failure thereof. The auxiliary pump 72 preferably includes a check valve 86 for preventing back flow from the hydromechanical portion 18 or the main pump 70 and also a pressure relief 84 for preventing the generation of hydraulic pressure in excess of the pump capacity.

Further elements of system 10 include a power lever angle measuring system 74 in the form of an RVDT, which also decreases system volume, which the power lever angle measuring system 74 functions to provide the electronic control 16 with an electrical signal indicative of power lever angle in the cockpit. Finally, a pair of condition levers 76 are provided as idle points for linkages in the nacelle which connect a condition lever in the aircraft cockpit with a fuel shutoff lever on the engine mechanical fuel control (not shown).

In operation, the electronic control 16 is the primary system for controlling blade pitch angle of the propeller blades 12 by commanding the control valve 20 to direct hydraulic pressure $P_C$, $P_F$ through lines $L_2$ and $L_1$ to the transfer tube 36 and the actuator 34. Accordingly, under normal operation, the protection valve 24 is preferably aligned for flow therethrough of hydraulic pressure from the control valve 20, through lines $L_1$ and $L_2$. In this manner, the transfer bearing 68 transmits the coarse and fine pitch hydraulic pressure $P_C$, $P_F$ from control valve 20. During normal usage, the blade angle feedback sensing system 30 provides continual information to the electronic control 16, constantly updating the blade pitch angle of the propeller blades 12.

In the event that a malfunction in the electronic control 16 results in an overspeed condition, or another condition such as test implementation and manual override, backup system overrides the electronic control 16 and assumes blade pitch control. In this situation, the overspeed governor 32 is operative to shift the protection valve 24, via lines $L_{3,1}$ and the draining of pressure $P_M$ to cause the actuator 34 to receive pressure $P_C$ and adjust the blade pitch angle of the propeller blade 12, for ending overspeed conditions. In addition to overspeed, if a malfunction in the electronic control 16 results in an inadvertent command of blade pitch angle below the minimum in-flight blade pitch angle, or another condition such as test or manual override arises, the secondary low pitch stop system, as described above, is caused to override the electronic control 16 and ultimately maintain blade pitch angle above the minimum value, stabilizing the propeller blades 12 through the metering of pressure $P_M$ from the protection valve 24 through lines $L_3$, $L_{3,3}$ for coarse blade pitch angle adjustment. Accordingly, through the protection valve 24 and a combination of lines $L_{3,1}$, $L_{3,3}$, $L_3$, when either the overspeed governor 32 or the secondary low pitch stop system 28 are involved, the protection valve 24 is shifted to a protection position which blocks flow from the control valve 20 to the transfer tube 36 and the actuator 34. In this manner, flow through lines $L_{3,1}$, $L_3$, $L_{3,3}$ is used for porting pressure $P_C$ to the coarse side of the actuator piston 33, while the fine side pressure $P_F$ is drained. Accordingly, blade pitch angle is stabilized toward high pitch via the actuator 34 driven by backups, the governor 32, and the low pitch stop system 28.

As indicated, the electronic control 16 may be overridden by the mechanical backup system 25, specifically the low pitch stop system 28, for testing of the backups prior to flight. The electronic control 16 also has the ability to perform its own test on the low pitch stop system 28 prior to flight by finely adjusting blade pitch angle until the low pitch stop is activated by receiving feedback from the blade pitch angle sensing system 30 as to blade pitch angle at the time of activation of the low pitch stop system 28, the electronic control 16 can determine if the low pitch stop system is activating at the proper blade pitch angle.

In addition to the overspeed governor 32 and low pitch stop system backups, the feather solenoid 26 may be manually invoked for emergency feather, thereby overriding the electronic control 16 and the control valve 20. Accordingly, with the malfunction of the electronic control 16 and other conditions that may require the propeller blades 12 to go to feather, the electronic control 16 is manually overridden by the pilot via the feather solenoid 26 to change the blade pitch angles of the propeller blades 12 in the full coarse direction to feather. In this scenario, the protection valve 24 is again moved to the protective position whereby flow from the control valve 20 is cut off, thereby cutting off the electronic control 16. Hydraulic pressure $P_M$ is drained from the protection valve 24 through line $L_{3,2}$ and supply pressure $P_S$ is ported to line $L_2$ to the coarse side of the actuator piston 33 for allowing rapid high pitch adjustment. When the feather solenoid 26 is relieved of control, the electronic control 16 will begin an unfeathering sequence during which the system will limit blade pitch angle decrease until the RPM of the blades nears the selected governing RPM.

Additionally, the propeller control system 10 includes a differential gear train 60 that is operably connected to a propeller hub 14 and the transfer tube 36. In an embodiment, the differential gear train 60 is mechanically connected to the propeller hub 14 and the transfer tube 36. It is understood that while the differential gear train 60 is illustrated in FIG. 1 as being mechanically connected to the propeller hub 14 and the transfer tube 36 forward of (in other words "to the left of" in FIG. 1) the windows 44, 46, 48, the embodiment disclosed herein may be applicable to any other configuration, such as, for example, the differential gear train 60 being mechanically connected to the propeller hub 14 and the transfer tube 36 aft of (in other words "to the right of" in FIG. 1) the windows 44, 46, 48. The propeller hub 14 rotates with the propeller blades 12. The propeller hub 14 is operably connected to an engine 64. The engine 64 is configured to rotate the propeller hub 14 and the propeller blades around the longitudinal axis C. The engine 64 is configured to rotate the propeller hub 14, and the propeller hub 14 is configured to rotate the propeller blades 12 around the longitudinal axis C of the propeller blades 12. The longitudinal axis C of the propeller blades 12 may be equivalent to the longitudinal axis B of the transfer tube 36. The engine may be a piston engine, a gas turbine engine, an electric motor, a hybrid motor, or any similar engine known to one of skill in the art.

The propeller hub 14 and the transfer tube 36 are mechanically connected to the differential gear train 60. The differential gear train 60 is a mechanical device that includes a first input 60a, a second input 60b and a differential gear train output shaft 60c. The propeller hub 14 mechanically connects to the differential gear train 60 at the first input 60a and the transfer tube 36 mechanically connects to the differential gear train 60 at the second input 60b. The propeller hub 14 rotates to first input 60a at a first rotational velocity and the transfer tube 36 rotates the second input 60b at a second rotational velocity. The differential gear train 60 has an differential gear train output shaft 60c that rotates relative to a mechanical ground 60d of the differential gear train 60. The differential gear train output shaft rotates 60c in a first direction or a second direction with a rotational velocity proportional to the difference between the first rotational velocity and the second rotational velocity. If the first input 60a and the second input 60b are rotating at exactly the same rotational velocity (i.e., the first rotational velocity equals the second rotational velocity), there is no rotation of the differential gear train output shaft 60c. If the first input 60a is rotating faster than the second input 60b (i.e., the first rotational velocity is greater than the second rotational velocity), then output shaft 60c may turn in a first direction (e.g., clockwise). In this situation, if second input 60b starts rotating faster than first input 60a (i.e., the first rotational velocity is less than the second rotational velocity), the differential gear train output shaft 60c would rotate in a second direction opposite the first direction (e.g., counter-clockwise). The differential gear train rotation sensor 50 is operably connected to the differential gear train output shaft 60c and configured to detect rotational velocity of the differential gear train output shaft 60c.

Referring now to FIG. 2, the propeller blade 12 is illustrated during a cruise position 210, a feather position 220, and a discing position 230 from different views including a side view at 280, a pitch change axis A view at 282, and a longitudinal axis C of the propeller blades 12 view at 284.

As illustrated in FIG. 2, the trunnion pin 43 is operably connected to the blade base 12A at a location 43A offset from the center point 88 of the blade base 12A. Since the trunnion pin 43 is operably connected to the blade base 12A offset from the pitch change axis A, the yoke plate 41 will rotate around the longitudinal axis C and move linearly along the longitudinal axis A as the piston 33 moves linearly along the longitudinal axis A. The rotation of the yoke plate 41 rotates the transfer tube 36 and the relative rotation of the transfer tube 36 is detected by the differential rotation sensor 50 that is connected to the differential gear train output shaft 60c, which then calculates the blade pitch angle of the propeller blades in response to the detected rotation direction and rotation magnitude of the transfer tube 36.

In order to move the propeller blade 12 to the cruise position 210, the piston 33 is moved in the fore direction 240 (i.e., forward direction) along the longitudinal axis C. As the piston 33 moves in the fore direction 240, the yoke plate 41 also travels with the piston 33 in the fore direction 240 because the yoke plate 41 is operably connected to the piston 33. As the yoke plate 41 travels in the fore direction 240, the trunnion pin 43 is pushed around the pitch change axis A in a counter clockwise direction 250 (viewing the propeller blade 12 from the point of reference of the transfer tube 36) because the trunnion pin 43 is operably connected to the yoke plate 41 but is also operably connected to the blade base 12A the location 43A, which is offset from the center point 88 of the blade base 12A at a selected distance D1 away from the pitch change axis A (i.e., center point of the blade base 12A). The cruise position 210 may be considered a neutral position for the propeller blade 12 for the purpose of discussion herein, thus when the propeller blade 12 is in the cruise position 210 then the trunnion pin 43 is aligned with the pitch change axis A (i.e., the trunnion pin is neither fore nor aft of the pitch change axis A), as illustrated in FIG. 2.

The rotation of the trunnion pin 43 around the pitch change axis A generates a rotation 260 of transfer tube 36 around the longitudinal axis C. The rotation 260 of the transfer tube 36 may be measured relative to the pitch change axis A of the propeller blade 12. The cruise position 210 may be considered a neutral position for the propeller blade 12 and thus the rotation 260 of the transfer tube 36 may about zero relative to the pitch change axis A (i.e., aligned with the pitch change axis A).

In order to move the propeller blade 12 to the feather position 220, the piston 33 is moved in the aft direction 242 along the longitudinal axis C. As the piston 33 moves in the aft direction 242, the yoke plate 41 also travels with the piston 33 in the aft direction 242 because the yoke plate 41 is operably connected to the piston 33. As the yoke plate 41 travels in the aft direction 242, the trunnion pin 43 is pushed around the pitch change axis A in a counter clockwise direction 250 (viewing the propeller blade 12 from the point of reference of the transfer tube 36) because the trunnion pin 43 is operably connected to the yoke plate 41 but is also operably connected to the blade base 12A at the location 43A offset from the center point 88 of the blade base 12A, which is a selected distance D1 away from the pitch change axis A (i.e., center point of the blade base 12A). When the propeller blade 12 in the feather position 220, the trunnion pin 43 is aft of the pitch change axis A, as illustrated in FIG. 2.

The rotation of the trunnion pin 43 around the pitch change axis A generates a rotation 260 of transfer tube 36 around the longitudinal axis C. The rotation 260 of the transfer tube 36 may be measured relative to the pitch change axis A of the propeller blade 12. While in the feather position 220 the rotation 260 of the transfer tube 36 may be at a feather angle α1 relative to the pitch change axis A.

In order to move the propeller blade 12 to the discing position 230, the piston 33 is moved in the fore direction 240 along the longitudinal axis C. As the piston 33 moves in the fore direction 240, the yoke plate 41 also travels with the piston 33 in the fore direction 240 because the yoke plate 41 is operably connected to the piston 33. As the yoke plate 41 travels in the fore direction 240, the trunnion pin 43 is pushed around the pitch change axis A in a clockwise direction 252 (viewing the propeller blade 12 from the point of reference of the transfer tube 36) because the trunnion pin 43 is operably connected to the yoke plate 41 but is also operably connected to the blade base 12A at the location 43A offset from the center point 88 of the blade base 12A, which is a selected distance D1 away from the pitch change axis A (i.e., center point of the blade base 12A). When the propeller blade 12 in the discing position 230, the trunnion pin 43 is forward of the pitch change axis A, as illustrated in FIG. 2.

The rotation of the trunnion pin 43 around the pitch change axis A generates a rotation 260 of transfer tube 36 around the longitudinal axis C. The rotation 260 of the transfer tube 36 may be measured relative to the pitch change axis A of the propeller blade 12. While in the discing position 230 the rotation 260 of the transfer tube 36 may be at a discing angle α2 relative to the pitch change axis A.

Advantageously, the blade angle sensing system 30 illustrated in FIGS. 1 and 2 allows the blade angle to be determined while being insensitive to axial movement of the propeller hub 14 relative to the engine 64.

Figure 3:
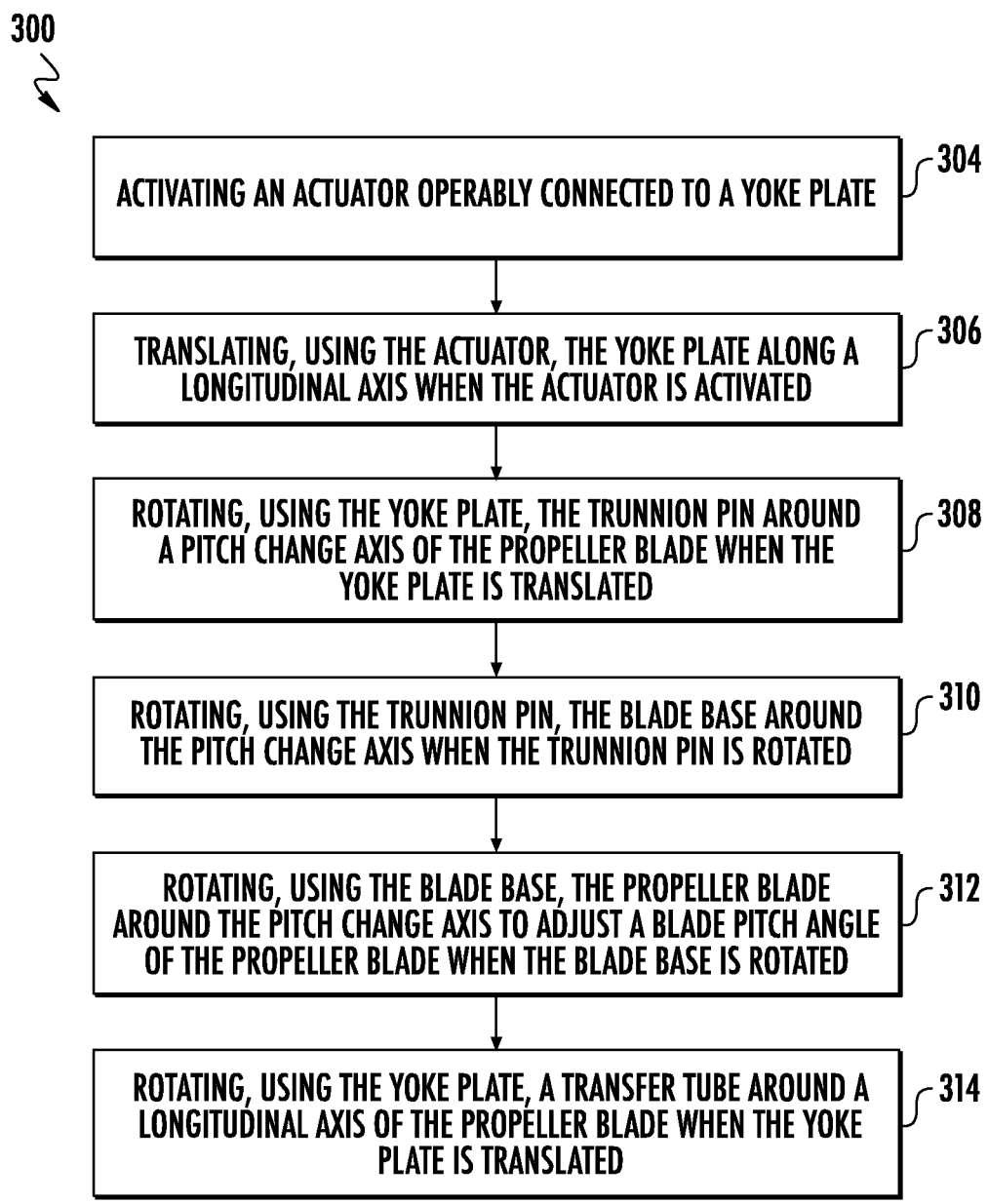
FIG. 3 illustrates a flow chart a method for controlling a blade pitch angle of the propeller blade of the propeller control system of FIG. 1, according to an embodiment of the present disclosure.

Referring now to FIG. 3, with continued reference to FIGS. 1-2. FIG. 3 shows a flow chart of a method 300 for method for controlling a blade pitch angle of a propeller blade 12, in accordance with an embodiment of the present disclosure. In an embodiment, the method 300 is performed by the propeller control system 10.

At block 304, the actuator 34 is activated. The actuator 34 being operably connected to a yoke plate 41. At block 306, the yoke plate 41 is translated, using the actuator 34, along a longitudinal axis C when the actuator 34 is activated. The yoke plate 41 being operably connected to a trunnion pin 43. At block 308, the trunnion pin 43 is rotated, using the yoke plate 41, around a pitch change axis A of the propeller blade 12 when the yoke plate 41 is translated. The trunnion pin 43 being operably connected to a blade base 12A of the propeller blade 12 at a location offset from a center point 88 of the blade base 12A.

At block 310, the blade base 12A is rotated, using the trunnion pin 43, around the pitch change axis A when the trunnion pin 43 is rotated. The pitch change axis A extending through the center point 88 of the blade base 12A and the propeller blade 12 extending from the blade base 12A. At block 312, the propeller blade 12 is rotated, using the blade base 12A, around the pitch change axis A to adjust a blade pitch angle of the propeller blade 12 when the blade base 12A is rotated. At block 314, a transfer tube 36 is rotated, using the yoke plate 41, around a longitudinal axis C of the propeller blade 12 when the yoke plate 41 is translated. The propeller blade 12 being configured to rotate around the longitudinal axis C to generate thrust for the propeller blade 12.

The method 300 may also comprise that a blade angle sensing system 30 determines the blade pitch angle in response to a rotational direction and a rotational magnitude of the transfer tube 36 relative to the propeller hub 14. The method 300 may further comprise that a differential rotation sensor 50 detects the rotational direction and the rotational magnitude of the transfer tube 36 relative to the propeller hub 14. The method 300 may yet further comprise that the differential gear train 60 is rotated using the transfer tube 36. The differential gear train 60 being mechanically connected to the transfer tube 36. The differential gear train 60 is also mechanically connected to the propeller hub 14. The method 300 may yet further comprise that the propeller hub 14 rotates the differential gear train 60. The differential gear train 60 senses the differential rotation of the propeller hub 14 to the engine 64. The method 300 may further comprise that the transfer tube 36 delivers hydraulic fluid through the transfer tube 36 to the actuator 34.

The method 300 may also comprise rotating a first input 60a of the differential gear train 60 at a first rotational velocity and rotating a second input 60b of the differential gear train 60 at a second rotational velocity. The propeller hub 14 mechanically connects to the differential gear train 60 at the first input 60a and the transfer tube 36 mechanically connects to the differential gear train 60 at the second input 60b. A differential gear train output shaft 60c of the differential gear train 60 rotates in a first direction or a second direction with a rotational velocity proportional to the difference between the first rotational velocity and the second rotational velocity. The method 300 may further comprise detecting, using a differential rotation sensor, the rotational velocity of the differential gear train output shaft 60c.

The method 300 may also comprise: rotating the differential gear train output shaft 60c in a first direction when the first rotational velocity is greater than the second rotational velocity. The method 300 may also comprise rotating the differential gear train output shaft 60c in a second direction when the first rotational velocity is less than the second rotational velocity, the second direction being opposite the first direction. The method 300 may further comprise maintaining the differential gear train output shaft 60c rotationally stationary when the first rotational velocity is equal to the second rotational velocity.

While the above description has described the flow process of FIG. 3 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A propeller control system for controlling a blade pitch angle, the propeller control system comprising:
    a propeller hub;
    a propeller blade extending from a blade base, the propeller blade attached to the propeller hub and being configured to rotate around a longitudinal axis to generate thrust for the propeller blade and rotate around a pitch change axis to adjust the blade pitch angle of the propeller blade, wherein the pitch change axis extends through a center point of the blade base;
    a trunnion pin operably connected to the blade base at a location offset from the center point of the blade base;
    a yoke plate operably connected to the trunnion pin;
    an actuator configured to move the yoke plate linearly along the longitudinal axis of the propeller blade to rotate the trunnion pin and the propeller blade around the pitch change axis;
    a transfer tube operably connected to the yoke plate, the transfer tube being free to rotate around the longitudinal axis as the actuator moves the yoke plate linearly along the longitudinal axis; and
    a blade angle sensing system configured to determine the blade pitch angle in response to a rotational direction and a rotational magnitude of the transfer tube relative to the propeller hub.

2. The propeller control system of claim 1, wherein the blade angle sensing system further comprises:
    a differential rotation sensor configured to detect the rotational direction and the rotational magnitude of the transfer tube relative to the propeller hub.

3. The propeller control system of claim 1, wherein the blade angle sensing system further comprises:
    a differential rotation sensor configured to detect the rotational velocity of the differential gear train output shaft.

4. The propeller control system of claim 1, wherein the actuator is a hydraulic actuator, and wherein the transfer tube is configured to deliver hydraulic fluid through the transfer tube to the actuator.

5. A propeller control system for controlling a blade pitch angle, the propeller control system comprising:
    a propeller blade extending from a blade base, the propeller blade being configured to rotate around a longitudinal axis to generate thrust for the propeller blade and rotate around a pitch change axis to adjust the blade pitch angle of the propeller blade, wherein the pitch change axis extends through a center point of the blade base;
    a trunnion pin operably connected to the blade base at a location offset from the center point of the blade base;
    a yoke plate operably connected to the trunnion pin;
    an actuator configured to move the yoke plate linearly along the longitudinal axis of the propeller blade to rotate the trunnion pin and the propeller blade around the pitch change axis;
    a transfer tube operably connected to the yoke plate, the transfer tube being free to rotate around the longitudinal axis as the actuator moves the yoke plate linearly along the longitudinal axis; and
    a differential gear train mechanically connected to the transfer tube.

6. The propeller control system of claim 5, further comprising:
    a propeller hub, wherein the differential gear train is mechanically connected to the propeller hub.

7. The propeller control system of claim 6, wherein the differential gear train further comprises:
    a first input, the propeller hub mechanically connects to the differential gear train at the first input and is configured to rotate the first input at a first rotational velocity;
    a second input, the transfer tube mechanically connects to the differential gear train at the second input and is configured to rotate the second input at a second rotational velocity; and
    a differential gear train output shaft rotates in a first direction or a second direction with a rotational velocity proportional to the difference between the first rotational velocity and the second rotational velocity.

8. A method for controlling a blade pitch angle of a propeller blade, the method comprising:
    activating an actuator operably connected to a yoke plate;
    translating, using the actuator, the yoke plate along a longitudinal axis when the actuator is activated, the yoke plate being operably connected to a trunnion pin;
    rotating, using the yoke plate, the trunnion pin around a pitch change axis of the propeller blade when the yoke plate is translated, the trunnion pin being operably connected to a blade base of the propeller blade at a location offset from a center point of the blade base;
    rotating, using the trunnion pin, the blade base around the pitch change axis when the trunnion pin is rotated, wherein the pitch change axis extending through the center point of the blade base and the propeller blade extending from the blade base;

rotating, using the blade base, the propeller blade around the pitch change axis to adjust the blade pitch angle of the propeller blade when the blade base is rotated; and rotating, using the yoke plate, a transfer tube around the longitudinal axis of when the yoke plate is translated, the propeller blade being configured to rotate around the longitudinal axis to generate thrust for the propeller blade; and rotating a differential gear train using the transfer tube, the differential gear train being mechanically connecting the transfer tube.

9. The method of claim 8, further comprising:

rotating the differential gear train using a propeller hub, wherein the differential gear train is mechanically connected to the propeller hub.

10. The method of claim 9, further comprising:

rotating a first input of the differential gear train at a first rotational velocity, the propeller hub mechanically connects to the differential gear train at the first input; and rotating a second input of the differential gear train at a second rotational velocity, the transfer tube mechanically connects to the differential gear train at the second input, wherein a differential gear train output shaft of the differential gear train rotates in a first direction or a second direction with a rotational velocity proportional to the difference between the first rotational velocity and the second rotational velocity.

11. The method of claim 10, further comprising:

detecting, using a differential rotation sensor, the rotational velocity of the differential gear train output shaft.

12. The method of claim 10, further comprising:

rotating the differential gear train output shaft in a first direction when the first rotational velocity is greater than the second rotational velocity.

13. The method of claim 12, further comprising:

rotating the differential gear train output shaft in a second direction when the first rotational velocity is less than the second rotational velocity, the second direction being opposite the first direction.

14. The method of claim 13, further comprising:

maintaining the differential gear train output shaft rotationally stationary when the first rotational velocity is equal to the second rotational velocity.

15. A method for controlling a blade pitch angle of a propeller blade, the method comprising:

activating an actuator operably connected to a yoke plate;

translating, using the actuator, the yoke plate along a longitudinal axis when the actuator is activated, the yoke plate being operably connected to a trunnion pin;

rotating, using the yoke plate, the trunnion pin around a pitch change axis of the propeller blade when the yoke plate is translated, the trunnion pin being operably connected to a blade base of the propeller blade at a location offset from a center point of the blade base;

rotating, using the trunnion pin, the blade base around the pitch change axis when the trunnion pin is rotated, wherein the pitch change axis extending through the center point of the blade base and the propeller blade extending from the blade base;

rotating, using the blade base, the propeller blade around the pitch change axis to adjust the blade pitch angle of the propeller blade when the blade base is rotated;

rotating, using the yoke plate, a transfer tube around the longitudinal axis when the yoke plate is translated, the propeller blade being configured to rotate around the longitudinal axis to generate thrust for the propeller blade; and determining, using a blade angle sensing system, the blade pitch angle in response to a rotational direction and a rotational magnitude of the transfer tube relative to a propeller hub.

16. The method of claim 15, further comprising:

detecting, using a differential rotation sensor, the rotational direction and the rotational magnitude of the transfer tube relative to the propeller hub.

17. The method of claim 8, further comprising:

delivering, using the transfer tube, hydraulic fluid through the transfer tube to the actuator, wherein the actuator is a hydraulic actuator.

* * * * *